Figure 1:
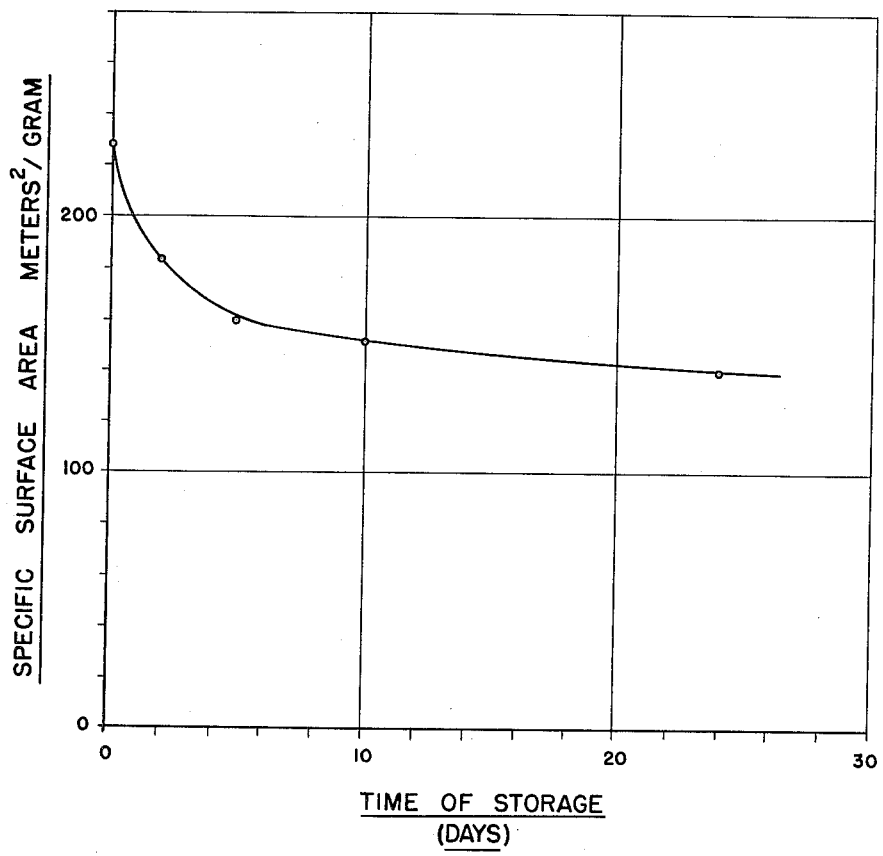

Sept. 11, 1962 G. L. FLEMMERT 3,053,627
PROCESS FOR THE PRODUCTION OF HYDROPHILIC SILICON DIOXIDE
Filed April 11, 1960 2 Sheets-Sheet 1

INVENTOR.
GÖSTA LENNART FLEMMERT
BY
his ATTORNEYS.

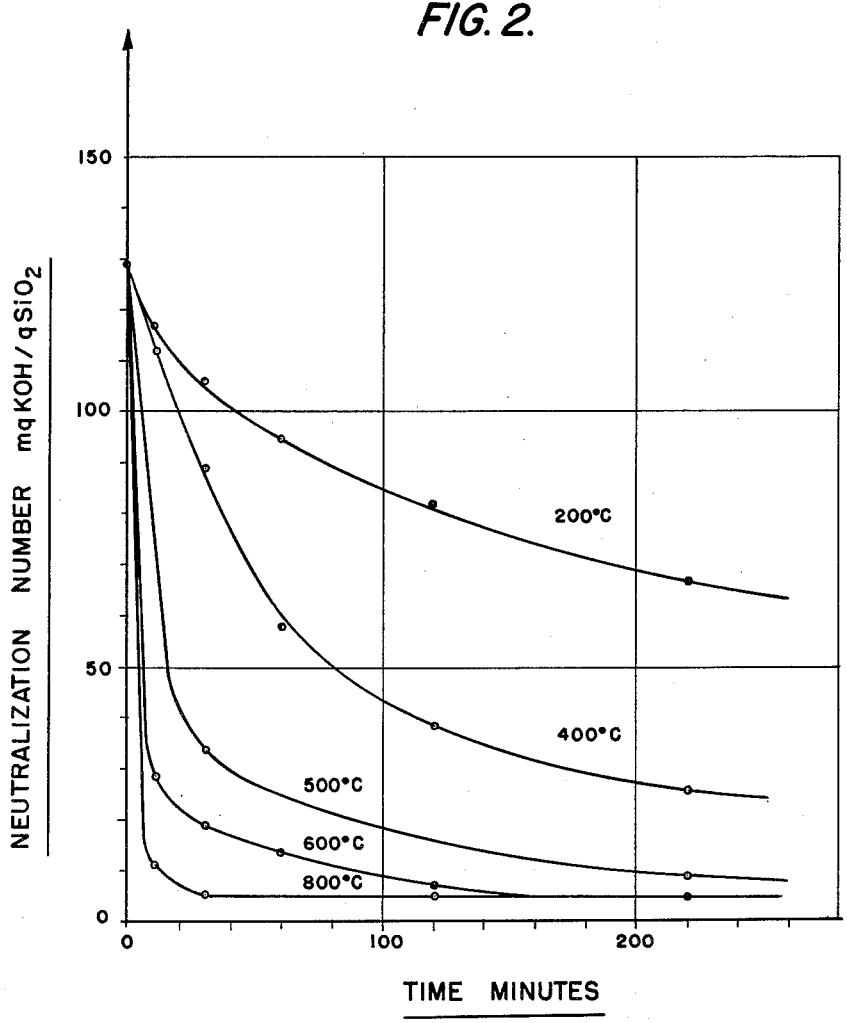

United States Patent Office 3,053,627
Patented Sept. 11, 1962

3,053,627
PROCESS FOR THE PRODUCTION OF HYDROPHILIC SILICON DIOXIDE
Gosta Lennart Flemmert, Nynasvagen 1A,
Nynashamn, Sweden
Filed Apr. 11, 1960, Ser. No. 21,129
3 Claims. (Cl. 23—182)

The present invention relates to a method of converting a hydrophobic fluorine-containing silicon dioxide to a hydrophilic form by removal of adsorbed fluorine and/or hydrogen fluoride, and to the hydrophilic silicon dioxide which is obtained as a result of this process.

This application is a continuation-in-part of Serial No. 722,271, filed March 18, 1959, now abandoned, which in turn was a continuation-in-part of Serial No. 683,444, filed September 12 1957, and Serial No. 437,383, filed June 17, 1954 (in Sweden March 2, 1954), now U.S. Patent No. 2,819,151, issued January 7, 1958.

In U.S. Patent No. 2,819,151, patented January 17, 1958, there is described and claimed a process for reacting silicon fluorides such as silicon tetrafluoride in the vapor phase with oxygen and a combustible gas to form silicon dioxide and hydrogen fluoride. This process is especially adapted for making silicon dioxide in the form of amorphous, finely-divided particles ranging from about 5 to about 50 millimicrons in mean diameter. Silicon dioxide also is obtainable by hydrolyzing silicon tetrafluoride with water, either in the gas phase or in solution. For example, the Broughton Patent No. 2,535,036 of December 25, 1950, describes the vapor phase hydrolysis of $SiF_4$ to produce silica. The product usually has a mean particle size below 200 millimicrons, for instance, 100–200 millimicrons.

The silicon dioxide obtainable from silicon fluorine compounds shows a striking tendency to agglomerate during storage in air, with the result that a more coarsely grained product is obtained, slowly. This, of course, is undesirable where a finely-divided material is desired. Moreover, it has been noted that such silicon dioxide is blendable only with great difficulty in aqueous solutions and water-containing pastes. This difficulty arises from what may be described as an essentially hydrophobic characteristic. It has also been determined that such silicon dioxide tends to liberate acidic products, probably hydrogen fluoride, which are disadvantageous when neutrality is desirable, as when the silicon dioxide is used as a filler in silicone rubber. The acidic nature of the products is easily ascertained by wetting the silicon dioxide with boiling water and titrating the resulting suspension with caustic, for example, potassium hydroxide solution. Neutralization numbers (milligrams of KOH per gram of $SiO_2$) as high as 130 are usually obtained from such silicon dioxide.

In accordance with the instant invention, it has been found that by treating such hydrophobic silicon dioxide with water vapor, e.g., steam, at a temperature above 500° C. up to approximately 1000° C., the hydrophobic properties are destroyed and a silicon dioxide is obtained which is strongly hydrophilic. It is completely storage stable and shows no tendency to agglomerate on storage in air. At the same time, the silicon dioxide, according to the invention, has a minimum acidity corresponding closely to that of normal silicon dioxide.

The silicon dioxide produced, is characterized in that it has a neutralization number below 15 and preferably below 10. These numbers represent the low inherent acidity of silicon dioxide, and also include a slight fluorine content. For the neutralization number of 15, the fluorine content is about 0.37% by weight, and for the neutralization number of 10, it is about 0.21% by weight. The actual fluorine content is significant, however, being equal to at least about 0.01% by weight.

The reason for the effectiveness of the steam treatment of the invention is not fully understood. It is suggested, however, that the hydrophobic characteristic of the silicon dioxide may be due to the formation of a silicon fluorine compound on the surface of the silicon dioxide particles. A barrier also may be formed due to the adsorption of hydrogen fluoride by the silica, resulting in some molecular association, short of chemical combination, such as a monomolecular layer. Fluorine also may be present. In the treatment, the water vapor destroys the barrier or compound, and converts the hydrophobic silicon dioxide into a hydrophilic material.

Water vapor may be used in the form of pure steam or diluted with a gas which is inert to silicon dioxide such as, for example, air, nitrogen or carbon dioxide.

It is important to note that temperatures in excess of 500° C. are required. At temperatures below 500° C. there is some reduction in acidity, but the conversion of the silicon dioxide to a hydrophilic form is not complete, and ceases at a limiting point well short of the minimum obtainable at more elevated temperatures. Moreover, the reduction in acidity is very slow, whereas at temperatures of 500° C. and higher the reduction in acidity is rapid, and can be nearly complete in twenty minutes' time or less. It is also important to note that a simple heating of the fluorine-containing product at temperatures in excess of 500° C. without the use of water vapor is not effective. Therefore, a hydrolysis of some type may be involved.

In the drawings, FIGURE 1 shows the increase in particle size of a hydrophobic silicon dioxide with time at room temperature in air, and FIGURE 2 shows the reduction in acidity of a hydrophobic silicon dioxide when treated with water vapor in accordance with the invention at temperatures of 200° C., 400° C., 500° C., 600° C. and 800° C.

It is apparent from FIGURE 2 that the time required for the treatment depends upon temperature to a remarkable degree. The higher the temperature, the more rapidly the reduction in acidity proceeds. The limiting neutralization number is approximately 5. This is reached in thirty minutes' time at 800° C., four hours' time at 600° C. and something beyond four hours at 500° C. It is not reached at all at temperatures below 500° C.

The reduction in acidity also is dependent upon the quantity of water vapor supplied per unit weight of silicon dioxide. The more water vapor, the less treatment time is required. The specific surface area and the initial degree of hydrophobicity are of minor importance. The treatment time required increases as the specific area and/or hydrophobicity increase.

The treatment can be carried out using conventional apparatus for bringing a finely-divided solid substance into contact with the gaseous medium. The apparatus desirably should be fitted for the introduction of superheated steam. A reactor can be used in which the silicon dioxide in a fluidized state is brought into contact with water vapor or steam. A spray tower also can be used, into the top portion of which the silicon dioxide is distributed and is allowed to flow by gravity down the tower in counterflow to water vapor or steam. The process can also be carried out in a rotary drum slightly inclined to the horizontal, and within which the silicon dioxide in counterflow is brought into contact with water vapor.

It is desirable to prevent condensation of the steam on the silicon dioxide, and accordingly after the treatment is complete it is preferable to displace the steam by air at a temperature high enough to avoid condensation.

The water vapor which has been used for the treatment of the silicon dioxide contains silicon tetrafluoride and hydrogen fluoride. These can be removed by passing the water vapor through a tower containing calcium oxide, which then permits use of the water vapor again, thus enabling the saving of considerable amounts of heat.

The best embodiments of the invention, in the opinion of the inventor, are represented by the following examples:

*Examples 1 to 5*

Silicon tetrafluoride was generated by heating a mixture of silica (sand) and calcium fluoride together with sulfuric acid. The silicon tetrafluoride so obtained was mixed with a commercial propane blend and air, and the mixture burned using a jet burner fitted with three concentric tubes. The mixture of silicon tetrafluoride, propane, oxygen and inert gases was passed through the intermediate tube and air was passed through the outermost and innermost tubes. The propane had the composition 3% methane, 11% ethane, 51% propane and 25% mixed butanes. The silicon dioxide formed was separated from the combustible gases using a ceramic filter. The product was white, amorphous and voluminous, and by examination proved to be made up of amorphous spherical particles having an average grain size of 12 m$\mu$ and a specific surface area of 228 square meters per gram. The material was strongly hydrophobic. When a sample was poured on the surface of boiling water, the powder was wetted only after a considerable interval, and an acidic suspension of silicon dioxide was obtained. The neutralization number (mg. KOH per gram of $SiO_2$), determined by titrating this suspension with 0.1 N potassium hydroxide, was 129, phenolphthalein being used as the indicator. On storage in air at room temperature, the specific surface area of the product was reduced, in the manner shown in FIGURE 1.

This silicon dioxide was divided into five portions of 10 kg. each. Each portion was introduced separately into a cylindrical drum which was rotated at 5 turns per minute about the horizontally disposed cylinder axis. The rotating drum was heated by means of an electric resistance conductor to temperatures of 200° C., 400° C., 500° C., 600° C., and 800 C., as noted in the table below. Steam preheated to the same temperature as the drum was supplied at a rate of 2 kg. per minute. Samples of the silicon dioxide were taken out at the time intervals noted in the table, and the neutralization number determined as described above. The test data are compiled in the table, and are graphically represented in FIGURE 2. The family of curves correspond to each of the test temperatures.

| Example No. | Temperature, °C. | Neutralization Number, Minutes (mg. KOH/g. SiO$_2$) Hours | | | | | |
|---|---|---|---|---|---|---|---|
| | | 0 | 10 | 30 | 1 | 2 | 4 |
| 1 | 200 | 129 | 116 | 106 | 94.8 | 82.0 | 66.5 |
| 2 | 400 | 129 | 111 | 89.0 | 58.1 | 38.7 | 25.8 |
| 3 | 500 | 129 | 75 | 33.5 | 24.5 | 15.8 | 8.8 |
| 4 | 600 | 129 | 28.4 | 18.7 | 13.2 | 7.1 | 5.1 |
| 5 | 800 | 129 | 11.6 | 5.2 | 5.1 | 5.1 | 5.1 |

The products were shown to be substantially fluorine-free when the neutralization number was below 15. At 15, the fluorine content is about 0.37%. Theoretically, a neutralization number of 15 corresponds to a fluorine content of about 0.50%, but normal silicon dioxide, having a surface area of about 100 square meters per gram, suspended in 100 ml. of water requires about 0.32 ml. of 0.1 normal potassium hydroxide for neutralization. This amount of potassium hydroxide, if calculated as the amount necessary to neutralize a fluorine-containing silicon dioxide product, would correspond to a theoretical fluorine content of about 0.13%. Subtracting this value from 0.50%, the fluorine content can be closely estimated at about 0.37% for the neutralization number of 15.

As previously indicated, the neutralization number is preferably below 10. This theoretically corresponds to a fluorine content of about 0.34%. However, using the above computations, the actual fluorine content, at this neutralization number, is probably about 0.21%.

The neutralization number of 5.1 obtained in the above Examples 4 and 5 corresponds to an actual fluorine content of about 0.04%. This value is obtained by subtracting from a theoretical fluorine content value of 0.17% the 0.13% silicon dioxide acidity value computed above.

It is apparent from the data that the acidity is reduced somewhat both at 200° C. and at 400° C. However, the minimum acidity is not obtainable at these temperatures, even after four hours of treatment. On the other hand, at temperatures of 500° C. and above, a very rapid reduction in acidity is obtained, and the limiting point is reached within about four hours. The increase in the reduction rate with temperature is very marked, and at 800° C. the minimum acidity is reached in thirty minutes' time. This shows the considerable importance of the treatment temperature. The minimum acidity which is obtained corresponds to the slight acidity inherently displayed by normal silicon dioxide.

The silicon dioxide samples obtained after the treatment were found to be entirely hydrophilic, and were wetted immediately and completely by water. The specific surface area was unchanged, or had increased to approximately 235 square meters per gram. The samples were subjected to storage for thirty days, in which time the specific area did not change, in contrast to the hydrophobic material.

I claim:

1. A process for converting hydrophobic fluorine-containing silicon dioxide prepared from a silicon fluoride to a hydrophilic substantially fluorine-free form, which consists essentially in treating the hydrophobic silicon dioxide with water vapor at a temperature above 500° C. until the neutralization number is reduced to below 15.

2. A process in accordance with claim 1 in which the silicon dioxide is treated at a temperature within the range from 500 to 1000° C.

3. A process in accordance with claim 1 in which the water vapor is diluted with an inert gas.

References Cited in the file of this patent

UNITED STATES PATENTS 2,477,695    Kimberlin    Aug. 3, 1949
2,535,036    Broughton    Dec. 26, 1950

OTHER REFERENCES

Iler: "The Colloid Chemistry of Silica and Silicates," Cornell Univ. Press, Ithaca, N.Y., 1955, page 170.